United States Patent [19]

Herder

[11] 4,360,498

[45] Nov. 23, 1982

[54] SECTIONAL LINED END BOX FOR CHEMICAL CELL

[76] Inventor: Robert O. Herder, Rte. 4, Box 510, Baileys Neck Rd., Easton, Md. 21601

[21] Appl. No.: 254,101

[22] Filed: Apr. 14, 1981

[51] Int. Cl.³ .............................................. B01J 19/02
[52] U.S. Cl. ................................. 422/241; 206/524.3; 220/21; 422/310
[58] Field of Search ....................... 422/240, 241, 310; 261/114 TC; 220/21, 22; 206/524.3

[56] References Cited

U.S. PATENT DOCUMENTS

| | | | |
|---|---|---|---|
| 1,454,945 | 5/1923 | Pfannenschmidt | 422/240 X |
| 2,210,457 | 8/1940 | Jones | 422/240 X |
| 2,385,954 | 10/1945 | Tarnopol | 422/240 X |
| 2,526,463 | 10/1950 | Ferguson | 422/241 X |
| 2,592,419 | 4/1952 | Harper et al. | 422/241 X |
| 2,876,927 | 3/1959 | Henning | 422/241 X |
| 4,221,763 | 9/1980 | Greene | 422/241 X |

*Primary Examiner*—Richard L. Chiesa
*Attorney, Agent, or Firm*—Holman & Stern

[57] ABSTRACT

The present invention relates to an end box for chemical cells, such as cells for producing chlorine. Such end boxes are known and are lined with a corrosion-resistant lining. The end box of the present invention is formed in a plurality of sections and is provided with separating baffles. These sections and baffles are individually and completely covered with a corrosion-resistant lining which is soft and flexible, and which can doubly function as a gasket material so that when the end box sections are assembled, no gaskets are required and the individual sections and baffles can be separately removed for replacement without disassembling the entire end box or removing the complete assembly from an associated cell.

7 Claims, 13 Drawing Figures

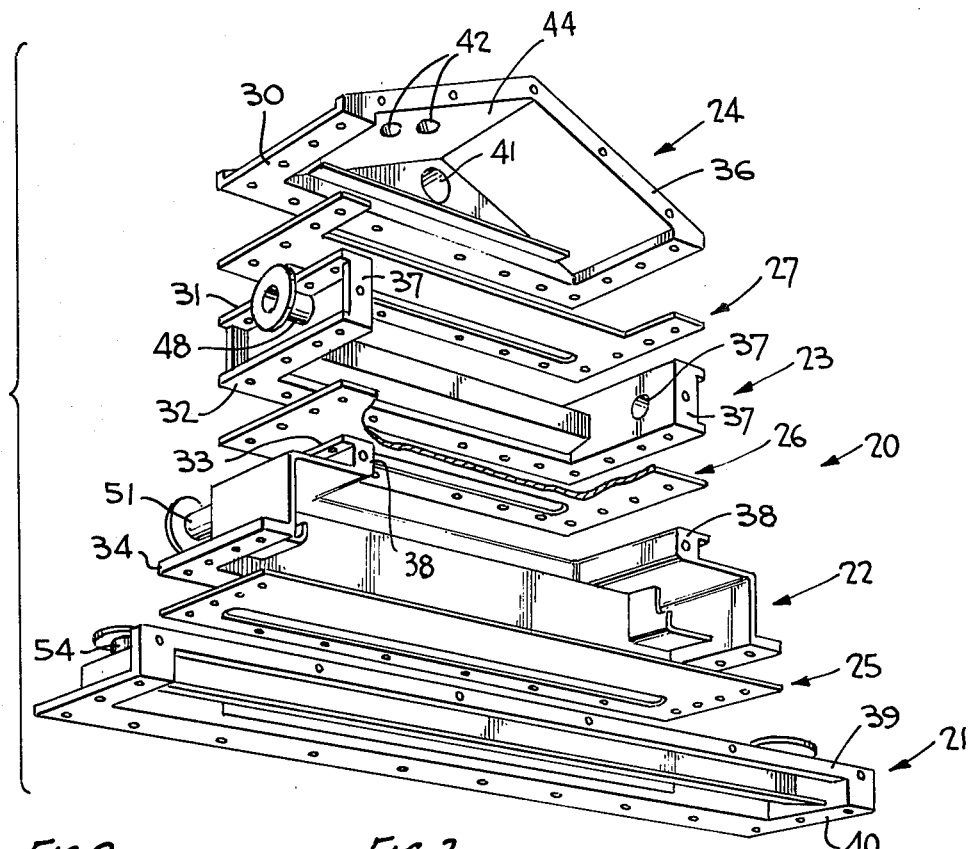

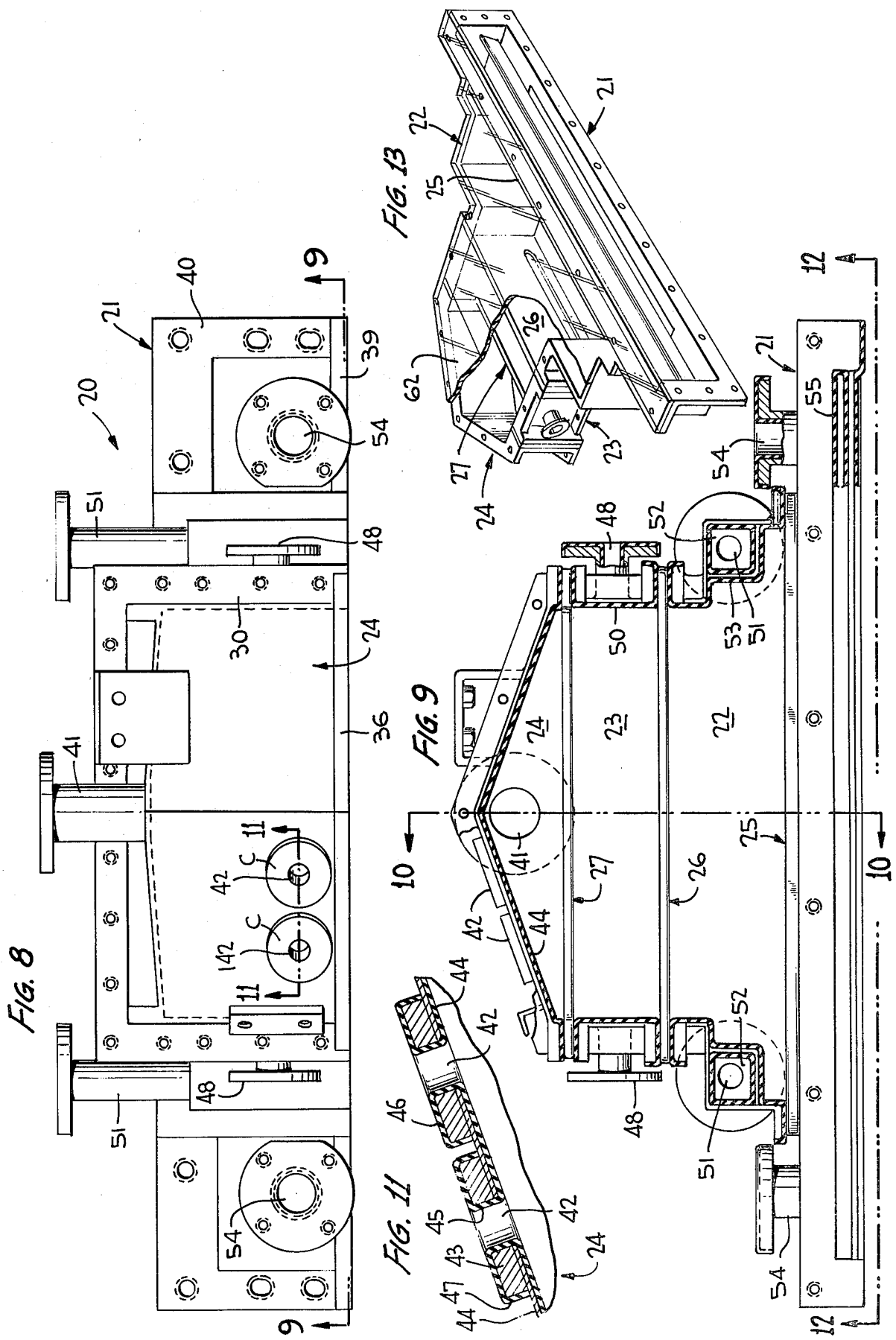

SECTIONAL LINED END BOX FOR CHEMICAL CELL

This invention relates in general to new and useful improvements in end boxes for chemical cells, and more particularly to end boxes which are subject to corrosion by chemicals and must be internally lined with a chemically resistant material.

Conventional end boxes of the type to which this invention relates are provided with fixed internal baffles and are thereby divided into a plurality of chambers. Further, such end boxes are provided with plural fluid flow fittings. Inasmuch as such end boxes are utilized in conjunction with corrosive chemicals, they must be fully internally lined with a suitable corrosion-resistant material.

In the past, the shape and construction of end boxes was controlled to a considerable extent on the lining compounds available at the time. The conventionally utilized compound was a rubber heavily filled with powdered graphite. The compound, when vulcanized, was quite hard, nearing the point of being brittle at lower temperatures. The graphite content of the rubber shielded it to an extent from attack by the chemicals and gave a reasonable performance life at temperatures compatible with the compound.

Experience, however, has shown that some areas in the conventional end box construction are prone to earlier failure than others. When one area fails in the conventional end box construction, it becomes necessary to remove and to reline the entire end box.

In accordance with this invention, it is proposed to line the end box with a softer lining material which will have the desired corrosion-resistant properties. It has been found that with the softer lining material, the lining material per se functions as a gasket. In view of this, it is now feasible to form the end box in a plurality of pieces and, additionally, the baffles may be separately formed. Because the lining material functions as a gasket, the end box pieces and baffles can be joined together without the use of sealing materials. Further, individual pieces of the end box may be readily removed for individual replacement. This is particularly true of the baffles.

It has also been found that by forming the end box in a plurality of pieces, it has been possible to modify the internal configuration of the end box such that applying the lining to the end box is greatly facilitated.

Having described the invention in general terms, specific and presently preferred embodiments will be set forth in the context of the illustrative drawing.

FIG. 1 is an exploded perspective view of the components of the end box prior to coating shown in vertical relation for the best illustration;

FIG. 2 is a plan view of the outermost baffle showing a portion only thereof coated;

FIG. 3 is a transverse vertical sectional view taken generally along the line 3—3 of FIG. 2 and shows the general construction of the baffle;

FIG. 4 is a plan view of an intermediate baffle with only a portion thereof coated;

FIG. 5 is a transverse vertical sectional view taken generally along the line 5—5 of FIG. 4 and shows the general construction of the baffle in FIG. 4;

FIG. 6 is a plan view of the innermost baffle with a portion only thereof coated;

FIG. 7 is a transverse vertical sectional view taken generally along the line 7—7 in FIG. 6 and shows the constructional details of the baffle of FIG. 6;

FIG. 8 is the outboard end view of the assembled end box with the components thereof coated or lined, but with the connecting bolts omitted for purposes of clarity;

FIG. 9 is a top section view of a lined and assembled end box taken generally along the line 9—9 of FIG. 8 and shows more specific details;

FIG. 11 is a fragmentary vertical sectional view on a larger scale taken generally along the line 11—11 of FIG. 8 and shows the details of the lining of flush nozzles;

Figure 10:
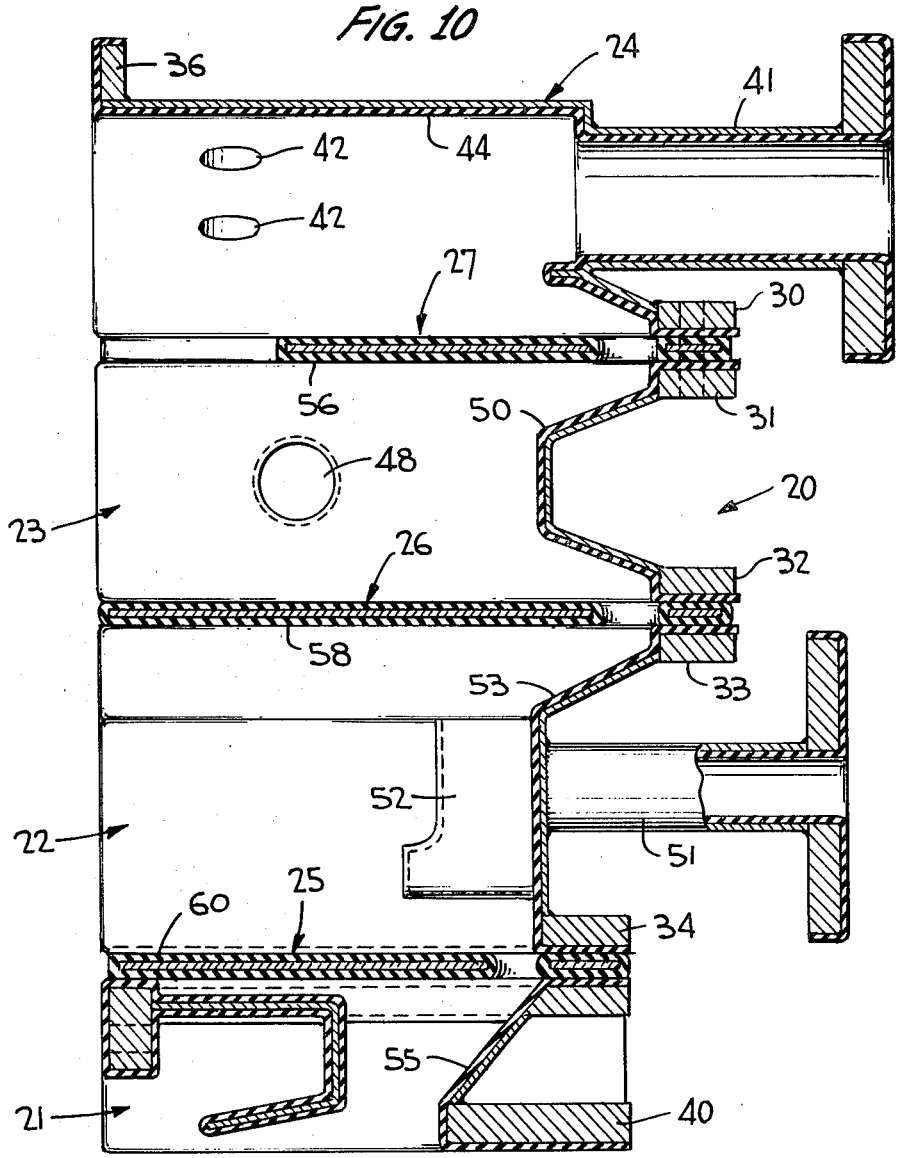
FIG. 10 is a vertical sectional view taken generally along the line 10—10 of FIG. 9 and shows further the constructional details of the lined end box and how the parts thereof are assembled.
Figure 12:
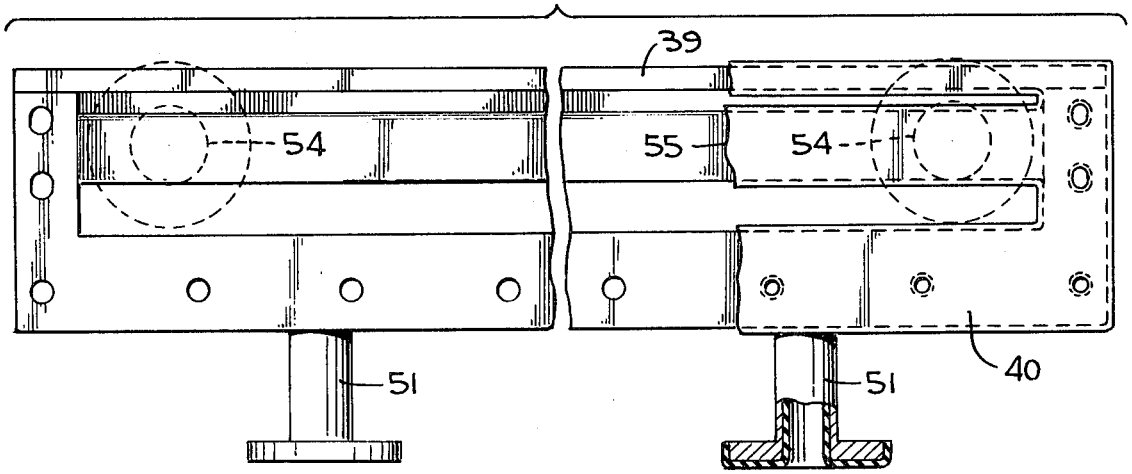
FIG. 12 is the cell end view of the assembled and coated end box with portions broken away and shown in sections; and, FIG. 13 is a perspective view of an assembled end box ready for attachment to a chemical cell.

Referring now to the drawings in detail, it will be seen that the complete end box is generally identified by the reference numeral 20. The illustrated end box is particularly configurated for attachment to the end of a cell utilized in chlorine generation. However, the specific configuration of the end box may be readily varied in accordance with the requirements of such end box and, thus, it is to be understood that the end box 20 as shown is merely one of many possible configurations.

Referring now to FIG. 1, it will be seen that the end box is formed of a plurality of components. More specifically, the end box 20 includes a cell-end section 21, an inner intermediate section 22, an outer intermediate section 23, and the outboard section 24. These sections are all individually fabricated.

There are also three baffles including baffle 25 which is disposed between the end box sections 21 and 22, baffle 26 which is disposed between the end box section 22 and 23, and baffle 27 which is disposed between sections 23 and 24.

It is to be understood that each of the baffles is removably bolted between its adjacent sections. The bolts, however, have been omitted for purposes of clarity.

The outermost section 24 is provided with a generally U-shaped assembly flange 30 which mates with flange 31 on box section 27. The baffle 27 is of a similar shape so as to conform to and seal flange 30 to 31.

In a like manner, the end box section 23 has a generally U-shaped assembly flange 32 which matches U-shaped assembly flange 33 on the section 22. In addition, the baffle 26 is of a size and outline to fit and seal flange 32 to flange 33 when bolted therebetween.

The section 22 also has a U-shaped assembly flange 34 which is boltable to the mating surface of the end box section 21. The baffle 25 is of a size and outline so as to fit and seal the assembly flange 34 to the surface of the section 21.

In order that the end box 20 may be secured to a cell (not shown) in sealed relation, the end box section 21 has mounting flange 40. This mounting flange is positionable and sealable to a flange provided on the associated cell.

In order that there may be selected fluid flow, the various sections of the end box are provided with flanged conduits. These flanged conduits include a downwardly directed conduit 41 on the section 24 and a pair of horizontal nozzles 42 on the same section. With reference to FIG. 11, it will be seen that the nozzles 42 are each defined by a flange-like member 43 which is suitably welded to the wall 44 of the section 24. When the section 24 is provided with its lining 44, a portion of the lining 45 protects the interior of the nozzles 42. Further, a portion 46 of the lining also extends across the face of the flanges. Where required, the lining portion 46 will function as a gasket.

With respect to the section 23, it wll be seen that the opposite sides thereof have evenly extending horizontal conduits 48. As is best shown in FIG. 9, the interior of the section 23 is provided with a lining 50, with the lining 50 also extending through the conduits 48 across the faces of their flanges in the manner described with respect to the flanges 43 in FIG. 11.

The section 22 is provided with a pair of downwardly extending conduits 51 which open from recessed chambers 52, as is best shown in FIG. 9. The section 22 is provided with a lining 53 which also lines the conduits 51 and their flanges.

Finally, the section 21 has extending horizontally from its rear surface, a pair of conduits 54. The section 21 has a suitable lining 55 which also extends into the conduits 54 across their flange faces.

At this time it is pointed out that the linings of the respective sections of the end box extend across all its flange faces where mounting or assembly takes place. The linings of the sections, being of a soft, resilient material, function as a gasket material.

As is clearly shown in FIGS. 2 and 3, the baffle 27 is provided with an overall coating 56. This coating is formed of the same materials as the linings. In a like manner, as shown in FIGS. 4 and 5, the baffle 27 is provided with a coating 58 and, as shown in FIGS. 6 and 7, the baffle 25 is formed with a coating 60. The coatings 56, 58, 60, being formed of a soft, resilient material, also functions as gaskets.

Reference is now made to FIGS. 9 and 10 wherein the components of the end box 20 are illustrated in their assembled positions. It will be seen that the baffles 25, 26, and 27 divide the end box into a plurality of chambers wherein separate fluid flow, as required, may be effected. It will also be seen that the baffles 25, 26, and 27 augment the function of gaskets between the various assembly flanges of the end box sections.

When the end box 20 is secured to an associated cell by means of bolts passing through the mounting flange 40, it will be seen that any section of the end box is individually removable without disturbing any but its mating flanges. Thus, if the lining on the section 24, for example, becomes damaged, it will be seen that by unbolting the assembly flange 30 from 31, the section 24 may be removed and replaced. In a like manner, each of the other sections may be individually removed without disassembling the entire end box. Further, the baffles 25, 26 and 27, which are primarily subject to corrosive attack, may be individually replaced by removing the bolts passing therethrough and sliding them out.

FIG. 13 is a perspective view of an assembled end box showing the proper positioning of the various individual components of the end cell assembled for attachment to a chlorine cell. The view shown includes a plexiglass cover 62 which fits over the top of the end box.

It will also be readily apparent that by forming the end box into four sections and by providing the baffles as separate components, when desired, the coatings or linings may be of different thicknesses or material in accordance with the expected or experienced attack by corrosive chemicals.

It is also to be understood that by forming the end box in a plurality of separate sections, the internal configuration of the end box may be readily modified for desired fluid flow and fluid level.

Although a preferred embodiment of the end box has been specifically illustrated and described herein, it is to be understood that variations may be made in the end box construction and configuration without departing from the spirit and scope of the invention.

It is claimed:

1. An end box for a cell subject to highly corrosive chemicals, said end box being generally in the form of a housing is divided into plural chambers by internal baffles, the said baffles within said housing by their design provide openings into various ones of said chambers; the improvement of said housing being formed in a plurality of sections each separated from one another by one of sid baffles, each of said housing sections having a connecting flange for joining of said sections, and each baffle having a peripheral edge portion disposed between flanges of adjacent housing sections that facilitate the individual removal and replacement of said baffles, each of said baffles including said peripheral edge portion thereof being lined with a resilient corrosion-resistant coating, and said coating on said baffle edge portions forming a gasket means for sealing said baffles to said housing sections.

2. An end box according to claim 1 wherein said flanges are mutually outwardly directed.

3. An end box according to claim 1 wherein surfaces of said housing sections and said baffles subject to attack by corrosive chemicals, are coated with a resilient coating material, said coating material being applied on said peripheral edge portions of each to form a sealing gasket between the respective baffles and the adjacent housing section flanges.

4. An end box according to claim 3 wherein said coating material overlies opposed surfaces of said housing section flanges with said coating material on said flanges also forming sealing gaskets.

5. An end box according to claim 1 wherein said flanges are outwardly directed and carry removable connecting means for at least partial disassembly of said end box while attached to a cell.

6. An end box according to claim 5 wherein each of said baffles including said peripheral edge portion thereof is coated with a resilient corrosion-resistant coating, and said coating on said baffle edge portions forming gasket means for sealing said baffles to said housing sections.

7. An end box according to claim 1 wherein surfaces of said housing sections subject to attack by corrosive chemicals are coated with a resilient coating material, said coating material being disposed on said peripheral edge portion of each and forming a sealing gasket between the respective baffle and the adjacent ones of said housing section flanges.

* * * * *